United States Patent [19]

Hobbs et al.

[11] 3,855,319

[45] Dec. 17, 1974

[54] PRODUCTION OF HYDROXY COMPOUNDS BY HYDROGENOLYSIS OF BUFFERED CARBOXYLATE SALTS

[75] Inventors: Charles C. Hobbs; John A. Bedford, both of Corpus Christi, Tex.

[73] Assignee: Celanese Corporation, New York, N.Y.

[22] Filed: Dec. 15, 1972

[21] Appl. No.: 315,385

Related U.S. Application Data

[62] Division of Ser. No. 64,665, Aug. 17, 1970, Pat. No. 3,752,861.

[52] U.S. Cl. ..................... 260/635 D, 260/638 A
[51] Int. Cl. ............................................ C07c 29/00
[58] Field of Search .................... 260/635 D, 638 A

[56] References Cited
UNITED STATES PATENTS

| | | | |
|---|---|---|---|
| 2,043,708 | 6/1936 | Pruckner | 260/638 A |
| 2,121,367 | 6/1938 | Schiller | 260/638 A |
| 2,121,368 | 6/1938 | Shiller | 260/638 A |
| 2,607,807 | 8/1952 | Ford | 260/635 D |
| 3,280,199 | 10/1966 | Schmerling | 260/638 A |
| 3,344,196 | 9/1967 | Corr et al. | 260/635 D |
| 3,478,112 | 11/1969 | Adam et al. | 260/635 D |
| 3,524,892 | 8/1970 | Horlenko et al. | 260/637 R |
| 3,752,861 | 8/1973 | Hobbs et al. | 260/635 D |

Primary Examiner—Joseph E. Evans
Attorney, Agent, or Firm—Ralph M. Pritchett

[57] ABSTRACT

Carboxylic acids are converted to the corresponding hydroxymethylsubstituted compounds by preparing an aqueous solution of their alkali metal salts buffered to a pH between about 6.0 and 7.0 and then reacting the buffered salt solution with hydrogen in the presence of a hydrogenolysis catalyst such as active metallic cobalt. In a particularly useful embodiment the potassium salts of carboxylic acids, dicarboxylic acids, and hydroxycarboxylic acids having at least about four carbon atoms are hydrogenolyzed in a reactor within which the desired buffering is accomplished with potassium bicarbonate in the presence of a finite concentration of free carbon dioxide. After the reaction step the liquid product is degassed at a temperature high enough to decompose potassium bicarbonate to potassium carbonate; the reaction product separates into two phases because of the salting-out action of the resulting potassium carbonate, and the organic products can be recovered by decantation while the aqueous phase, containing reuseable potassium carbonate, is recycled to the acid-neutralization step which precedes the hydrogenolysis.

5 Claims, No Drawings

PRODUCTION OF HYDROXY COMPOUNDS BY HYDROGENOLYSIS OF BUFFERED CARBOXYLATE SALTS

This is a division of application Ser. No. 64,665, filed Aug. 17, 1970 now U.S. Pat. No. 3,752,861.

BACKGROUND OF THE INVENTION

This invention relates to the conversion of carboxylic acids to the corresponding hydroxymethyl-substituted derivatives by hydrogenolysis of the carboxyl group to the hydroxymethyl group. More particularly it relates to a method for effecting such hydrogenolyses which does not require either the esterification of the carboxyl group as an initial process step nor the hydrogenolysis of the free carboxylic acid with the attendant drawbacks of process apparatus corrosion and resulting catalyst deactivation by corrosion products.

In a particularly useful embodiment this invention relates to a method for hydrogenolyzing unesterified carboxylic acids which, as compared with the prior art, is characterized by reduced energy requirements and a simplified process flow scheme in the product-recovery operations following the hydrogenolysis step.

It is known in the art to convert carboxylic acids to the corresponding hydroxymethyl-substituted compound by hydrogenolysis. Such processes are employed, for example, for the conversion of adipic acid, 6-hydroxycaproic acid, and their homologs to the corresponding diods, 1,6-hexanediol produced by such a method being a useful intermediate for the production (by reductive amination) of hexamethylenediamine, which is used in the manufacture of nylon salt. Simply monocarboxylic acids can also be converted to monohydric alcohols by the same method. Processes of this nature as heretofore carried out, however, have had drawbacks which are due to the acidity of the carboxylic acid feedstocks. Specifically, with many hydrogenolysis catalysts, such as copper chromite, catalyst deactivation by the free carboxylic acid necessitates esterification of the acid as a preliminary step before hydrogenolysis. Accomplishing the requisite substantially complete esterification necessitates the use of comparatively complicated and expensive process apparatus and also requires the use of substantial quantities of energy, e.g., steam. Alternatively, methods are known for hydrogenolyzing the unesterified acids by employing as hydrogenolysis catalyst rhenium black or pellets of sintered cobalt oxide which are reduced to metallic cobalt prior to the hydrogenolysis. Such catalysts can be employed for extended periods of time but have drawbacks in that they are comparatively expensive. Also they tend to become deactivated ultimately, either by the free carboxylic acid itself or by corrosion products resulting from interaction between the free carboxylic acid and the metals of which the process apparatus is fabricated and strong solutions of free carboxylic acid feedstocks aso cause the catalyst pellets to disintegrate. Thus the process of the prior art have been characterized by either the expense of preparing ester intermediates or, alternatively, the corrosion-relation difficulties of handling free carboxylic acids at the elevated temperatures characteristic of hydrogenolysis processes.

It is an object of the present invention to provide a method for effecting the hydrogenolysis of a carboxy-substituted compound to a corresponding hydroxymethyl-substituted derivative without the necessity of first converting the carboxylic feedstock to an ester. Likewise it is an object to provide a method for effecting such hydrogenolysis under conditions such that the contents of the hydrogenolysis reactor are of diminished acidity as compared with the conditions obtaining when such direct hydrogenolysis is carried out under the conditions characteristic of the prior art with resulting increase of catalyst life. It is another object to provide a method for hydrogenolyzing an aqueous solution comprising a carboxylic acid having at least about 4 carbon atoms in the molecule whereby, at the conclusion of the hydrogenolysis step, the products can be separated from the aqueous component of the reaction mixture by a simple decantation method not requiring distillation or evaporation. It is a particular object to provide an improved method for producing 1,6-hexanediol from adipic acid, 6-hydroxycaproic acid, epsilon-caprolactone, or a mixture of these as formed in the liquid-phase oxidation of cyclohexane.

Other objects of the invention will be apparent from the following detailed description, examples, and claims.

SUMMARY OF THE INVENTION

In accordance with the present invention a carboxy-substituted feed-stock, which may be a monocarboxylic acid, a dicarboxylic acid, a hydroxycarboxylic acid, or a lactone (which is the equivalent of a hydroxycarboxylic acid in the present context), is neutralized in aqueous solution with a basic alkali metal compound, especially with potassium; the resulting solution of the metal salt of the carboxylic acid feedstock is then buffered to a pH between about 6.0 and about 7.0, and the resulting buffered solution is then subjected to catalytic hydrogenolysis to form the hydroxymethyl-substituted derivative corresponding to the carboxylic. It has been discovered that, if the pH is adjusted in this manner so that there is no excess alkalinity, acid salts can in fact be hydrogenolyzed whereas they cannot be when excess alkalinity is present. Likewise, if the pH is maintained above about 6, catalyst life is extended and apparatus corrosion is reduced as compared with conditions prevailing when the free acid itself is hydrogenolyzed.

It has further been discovered that a particularly useful process results when a potassium salt of the carboxylic acid is employed and when the desired buffering is accomplished by maintaining a finite concentration of free carbon dioxide in the hydrogenolysis reactor (the resulting pH being that characteristics of the $KHCO_3 \rightleftarrows CO_2$ equilibrium). At the conclusion of the hydrogenolysis reaction carried out with this potassium salt: $CO_2$ system, the liquid hydrogenolysis product is degassed at reduced pressure and at a temperature sufficient to decompose potassium bicarbonate to potassium carbonate and carbon dioxide, whereby gaseous carbon dioxide is removed from the reaction product leaving behind a liquid phase in which the potassium content exists mainly as potassium carbonate. When the process is carried out in this manner with a hydrogenolysis product comprising predominantly a diol or diols having at least about 4 carbon atoms or alkanols having at least about 3 carbon atoms, a particularly advantageous process results in that, by maintaining in the hydrogenolysis product a potassium salt concentration of at least about 2 gram-equivalents of potassium per kilogran of water contained therein, it is possible to separate the organic hydrogenolysis product from an aqueous phase comprising water and the potassium carbonate by simply cooling the hydrogenolysis product mixture to a temperature at which two liquid phases form therefrom. The organic products can be recovered for whatever product workup process is desired by simply decanting the upper, organic, layer while the lower, or aqueous, layer containing the potassium carbonate can be recycled to the hydrogenolysis step of the process. That is, the aqueous phase is mixed with the carboxylic acid feedstock in sufficient quantity to prepare an aqueous solution thereof in which the carboxylic acid has been neutralized in accordance with the reaction:

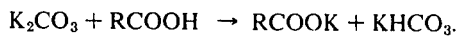

$$K_2CO_3 + RCOOH \rightarrow RCOOK + KHCO_3.$$

It will be recognized, of course, that the carboxylic acid in the foregoing equation can be a monocarboxylic or a dicarboxylic acid as well as a hydroxycarboxylic acid or a lactone.

With reference to the phase separation mentioned above, the potassium content of the mixture need not be as high as 2 gram-equivalents per kilogram of water when the hydrogenolysis product comprises predominantly molecules having more than 2 carbon atoms per hydroxyl group. Specifically, satisfactory phase separation obtains with only about 1 gram-equivalent of potassium per liter of water when the hydrogenolysis product comprises a pentanediol or a higher homolog such as 1,6-hexanediol. In accordance with the well-understood principles by which salt solutions have the effect of "salting out" organic components of aqueous solutions, even lower concentrations of potassium salt (or other alkali metal salts) can be employed when the hydrogenolysis products are less hydrophilic than 1,6-hexanediol.

Detailed Description and Preferred Embodiments of the Invention

Feedstocks

In terms of commercial importance, the carboxylic acid feedstocks to which the invention is particularly applicable comprise carboxyalkanes, dicarboxyalkanes, hydroxycarboxyalkanes, and lactones (which the cyclic esters of, and react during hydrogenolysis in the same manner, as hydroxycarboxylic acids). Particularly useful feedstocks are the carboxylic acids obtained by the liquid-phase oxidation of cyclohexane, including succinic, glutaric, adipic, propionic, butyric, valeric, and caproic acids, epsilon caprolactone, and the monohydroxy-substituted derivatives of butyric, valeric, and caproic acid including specifically 6-hydoxycaproic acid. Higher carboxyalkanes, dicarboxyalkanes, and hydroxycarboxyalkanes can also be treated, as well as the alkenoic acids. It will be recognized, of course, that hydrogenolysis of the alkenoic acids may result in formation of the saturated hydroxymethyl-substituted derivatives.

Broadly speaking, any carboxylic acid which is a amenable to catalytic hydrogenolysis can be hydrogenolyzed by the present process.

Buffering Systems

The first step of the process is the neutralization of the free carboxyl groups of the carboxylic acid feedstock, the resulting solution then being buffered to a pH between about 6 and 7. In carrying out this step any of several approaches can be taken, which will be obvious to those skilled in the art. For example, as in a preferred embodiment of the invention, the carboxylic acid can be neutralized with an at least equimolar quantity of an alkali metal carbonate, especially potassium carbonate, with sufficient free carbon dioxide then being added to convert any residual carbonate to bicarbonate while maintaining a finite concentration of residual free carbon dioxide. Another alternative is to neutralize the carboxylic acid with a di-alkalai metal hydrogen phosphate. Other methods for preparing buffered solutions of the alkali metal salts of the carboxylic acid feedstocks will be readily apparent, but the method just described entailing the use of an alkali metal carbonate and free carbon dioxide is particularly useful. It will be understood that during the hydrogenolysis step which follows the preparation of the buffered salt solutions the conversion of carboxylate moiety to hydroxymethyl moiety releases a quantity of alkali stoichiometrically equivalent to the converted carboxylate moiety. It is necessary, therefore, that the weak acid component of the buffer system be present in the hydrogenolysis reactor in at least sufficient quantity to neutralize this freed alkali while still maintaining a finite quantity of said weak acid component. For example, it is necessary that when the weak acid component is carbon dioxide, there be maintained in the hydrogenolysis reactor enough carbon dioxide to neutralize the freed alkali and still maintain an excess of free carbon dioxide (or carbonic acid).

Concentration of the components of the hydrogenolysis feedstock solution, as distinguished from the stoichiometric relationships among its components as discussed above, is not critical in the broader aspects of the invention. However, concentration is a significant parameter in that embodiment in which recovery of the hydrogenolysis products is effected by decantation of an organic liquid layer as previously discussed. Specifically, for that system in which potassium carboxylates have been hydrogenolyzed in the presence of the potassium bicarbonate-carbon dioxide buffer system, it is recommended that, when the phase separation is carried out, there be present in the liquid product mixture at least about 1 gram-equivalent of potassium per kilogram of water contained in the mixture. This is sufficient to "salt out" an organic phase comprising the hydrogenolysis product if the organic phase comprises predominantly dihydroxy compounds having in the molecule at least about 2.5 carbon atoms per hydroxyl group of monohydroxy compounds having at least about 4 carbon atoms per hydroxyl group (e.g., pentanediol and its higher homologs or butanol and its higher homologs). If the hydrogenolysis product comprises predominantly a butanediol, e.g., 1,4-butanediol, a somewhat high potassium concentration is recommended, i.e., at least about 2 gram-equivalents per kilogram of contained water. Higher concentrations of dissolved potassium than those just named have no ill effect, of course, and will in fact enhance the degree of phase separation in marginal situations, i.e., when the hydrogenolysis product tends to be rather strongly hydrophilic.

With further reference to the matter of concentration, water content of the hydrogenolysis feedstock solution is not critical although at least enough water should be present to dissolve any components of the feedstock which are normally solids, e.g., the carboxylate salts themselves. The use of highly dilute solutions has no ill effect other than increasing the quantity of liquid which must be processed thorough the hydrogenolysis reactor per unit of organic material and decreasing the reaction rate.

Hydrogenolysis

The details of how the hydrogenolysis step itself is carried out are not pertinent to the present invention except that this step of the process is carried out by the generally-understood processes for hydrogenolyzing liquid feedstocks comprising free carboxylic acids. Such a process is described in British Pat. No. 921,477, which deals with the hydrogenolysis of aqueous or alcoholic solutions of a variety of carboxylic acids in the presence of sintered cobalt oxide which has bee pre-reduced with hydrogen before use in the hydrogenolysis process. Hydrogenolysis temperatures are in the range of 150° to 300°C, preferably 200° to 250°C; hydrogenolysis pressure is about 5 to 500 atmospheres, especially 50 to 350 atmospheres. Pressure and temperature are, of course, so correlated that a liquid phase is always maintained in the reaction chamber. These conditions are applicable in the hydrogenolysis step of the present invention. Other forms of catalysts having a catalytically active metallic cobalt surface, e.g., fine cobalt precipitated on inert supports such as stoneware, can also be employed; the invention is not restricted to use of the reduced sintered cobalt catalysts, although these typify the presently available catalysts which are generally employed for hydrogenolysis of free acids. Rhenium black is also a suitable hydrogenolysis catalyst.

It will be recognized, of course, that in applying the present invention in the hydrogenolysis reaction systems typical of the prior art, minor modifications will be made as necessary to allow for the fact that the reaction medium will contain alkali metal salts as well as organic compounds. Specifically, sufficient water will be maintained in the reaction medium to assure that the carboxylate salts and any inorganic salts which are present (e.g., potassium bicarbonate) will not be precipitated from solution. Water concentrations as employed in the typical prior art are sufficient for this purpose. Also, in that useful embodiment of the invention in which carbon dioxide is a component of the buffer system, it will be understood that a finite quantity of free carbon dioxide (or carbonic acid) is maintained in all portions of the hydrogenolysis reactor. As will be understood, the concentration fo carbon dioxide is not critical so long as a finite amount is present. When carbon dioxide is employed in this manner it can be added in its entirety at the start of the reaction, i.e., incorporated into the hydrogen entering the reactor, or, if desired, distributed at several points along the axis of the reactor (if the reactor be one of elongated proportions). The quantity of carbon dioxide required is not of such a magnitude as to require any substantial elevation of reaction pressure to allow for the partial pressure of carbon dioxide incorporated into the hydrogen gas phase.

It will be recognized also that the type of hydrogenolysis reactor to be employed is not critical; any type suitable for the hydrogenolysis processes of the prior art is suitable, e.g., stirred autoclaves or, more preferably, vertical vessels or tubes through which the liquid feedstock is passed and within which it is contacted with hydrogen and the catalyst, typically positioned in the reactor as a packed bed of pellets or catalyst-coated supports such as Berl saddles.

Product Recovery

In its broader aspects the invention is not restricted to any particular method for recovering the organic products of the hydrogenolysis reaction. The liquid product withdrawn from the hydrogenolysis reactor comprises one or more hydroxy compounds,, typically alkanols, alkanediols, or both, along with some water and a quantity of inorganic salts. When it comprises but a single phase, and when the buffering system being employed is not one in which potassium bicarbonate decomposition is, for example, employed to salt out the organic components, conventional methods can be employed to recover the organic products. For example, the organic products can be separated from the water and the inorganic salts by solvent extraction with, for example, an ester such as a lower alkyl carboxylate, followed by distillation if desired. The inorganic buffering agent or agents can then be recycled, if desired, to the neutralization and hydrogenolysis steps of the process.

In the preferred embodiment of the invention, however, the potassium bicarbonate-carbon dioxide buffering system is employed in the hydrogenolysis, with the result that the hydrogenolysis product comprises alkanols and/or alkanediols, water, and potassium bicarbonate along with some dissolved carbon dioxide. It will be understood, of course, that some hydrogen may also be present until the product has been degassed; any such excess hydrogen will, of course, typically be separated from the reaction product before workup of the liquid product itself.

The liquid hydrogenolysis product may or may not exist in a single liquid phase as it is withdrawn from the reactor. If there are two liquid phases, they can be handled together during the degassing and product-separation steps which are to follow.

The first step is to degas the liquid reacton product, at a temperature high enough to thermally decompose aqueous potassium carbonate to potassium carbonate, while maintaining a sufficiently high pressure to retain the bulk of the reaction product in the liquid phase. The required temperature is in the range of about 90°C to 110°C, with about 105° to 107°C being particularly suitable. At these temperatures, substantially atmospheric pressure can be employed. Higher temperatures can be employed if desired, with correspondingly higher pressures being employed to maintain an aqueous liquid phase in the material being degassed. The evolved carbon dioxide is vented from the degassing reaction vessel and is either discarded or, if vessel land is either discarded or, if desired, recycled to the hydrogenolysis reactor. It will be recognized that complete decomposition of all the potassium bicarbonate contained in the reaction product to potassium carbonate is not essential; undecomposed bicarbonate can be recycled to the hydrogenolysis reaction step if desired, so long as sufficient carbonate is provided to neutralize all of the fresh carboxylic acid feedstock which is to be hydrogenolyzed in the hydrogenolysis step of the process. In batch degassing, the bicarbonate-decomposition step is carried out by holding the liquid at the desired degassing temperature until carbon dioxide evolution has substantially ceased. In continuous operations this step can be controlled by coordinating degassing temperature and retention time at such levels that carbon dioxide is evolved at a rate such that substantially the entirety of the potassium bicarbonate fed into the degasser is converted to potassium carbonate.

After degassing, the liquid reaction product is cooled as necessary to effect its separation into two liquid phases. With higher molecular weight hydrogenolysis products such phase separation may take place, or at least take place to some extent, at the degassing temperature, i.e., at about 100°C. With lower molecular weight products, however, cooling is necessary to effect phase separation and, even with higher molecular weight products, cooling is recommended to enhance the efficiency of the separation. More particularly, it is recommended that the degassed liquid be cooled to roughly 40°C for optimal phase separation efficiency.

After the phase separation has occured, the lower or aqueous, layer is advantageously employed again for neutralizing the carboxylic acid feedstock. It will be recognized that in some circumstances it may be desirable to remove water-soluble organic impurities from this aqueous phase to prevent their buildup in the reaction system. The upper, or organic phase is forwarded to product purification steps which are outside the scope of the invention and which will vary according to the nature of the hydrogenolysis product but which typically comprise distillation to separate the mixture into its various components as desired.

In connection with the foregoing discussions of the hydrogenolysis and product recovering steps it should be noted that it is not essential that the hydrogenolysis step of the process be carried entirely to completion; that is there is no disadvantage if the reactor product from the hydrogenolysis step still contains a portion of unreacted carboxylate salts of the carboxylic acid feedstock. In the process employing potassium carbonate and subsequent phase separation of the product, such carboxylate salts partition strongly into the aqueous phase, with the result that they are easily recycled with the aqueous phase to the neutralization and hydrogenolysis steps of the process. Thus the unconverted carboxylate moiety is both separated from the recovered organic products (the organic layer formed in the phase separation) and also recycled for further hydrogenolysis. The result is the maintainenance of a high hydrogenolysis reactor throughput (reactor volume for, say, 90 percent conversion being ordinarily much less than the volume required for, say, near-100 percent conversion) and also a reduction in corrosion in the product purification apparatus which would otherwise take place if free carboxylic acid were present in the crude organic products being distilled or otherwise processed.

The following examples are given to further illustrate the practice of the invention; it will be recognized that many variations can be made therefrom within the scope of the invention.

Example I

As hydrogenolysis feedstock there was employed a crude mixture of carboxylic acids obtained by the liquid phase oxidation of cyclohexane and containing, by weight, approximately 20% of adipic acid, 2% succinic acid, 4% glutaric acid, 10% 6-hydroxycaproic acid and epsilon-caprolactone, and the remainder a mixture of other alkanecarboxylic acids, dicarboxylic acids, and hydroxycarboxylic acids of less than 6 carbon atoms per molecule derived from the oxidation of cyclohexane.

The feedstock just described was dissolved in a methanol-water mixture containing 25 weigth percent methanol and the remainder water, to make a 10 percent solution. The methanol was employed for the purpose of simplifying the measurement and analysis of the anticipated hydrogenolysis product by prevent the formation therein of two liquid phases.

The solution just described was neutralized with disodium hydrogen phosphate, to a pH of about 6.2 as measured at room temperature. The neutralized solution was then placed in a rocking autoclave containing, per 100 ml of the solution, approximately 30 grams of 3/16-inch diameter pellets of a sintered metallic cobalt catalyst formed by reducing sintered cobalt oxide pellets with hydrogen according to the methods customarily employed in the prior art (e.g., as in British Pat. No. 921,477) for preparing and conditioning such catalysts. The contents of the autoclave were then treated with hydrogen for about 4 hours at 230°C and at about 300 atmospheres of hydrogen pressure.

Upon cooling the autoclave, releasing the hydrogen, and analyzing the liquid product, it was determined that, within the limits of analytical accuracy, all of the carboxyl moiety in the feedstock had been converted to hydroxymethyl moiety. Substantially all of the adipic acid, hydroxycaproic acid, and caprolactone had been converted to 1,6-hexanediol.

Example II

The same feedstock solution employed in Example I was neutralized with potassium carbonate instead of disodium hydrogen phosphate. Approximately 1 mole of potassium carbonate was employed per equivalent of carboxyl moiety in the feedstock. The neutralized solution had a pH of approximately 8.0. Potassium bicarbonate was then added, in an amount of 1 mole per mole of potassium carbonate.

The neutralized solution was placed in the same autoclave as employed in Example I along with the same catalyst, the ratio of catalyst to reactant solution being the same also as in Example I. Additionally, approximately 2 grams of solid carbon dioxide was placed in the autoclave per 100 ml of reactant solution. Carbon dioxide was added in this manner instead of as carbon dioxide gas for the sake of convenience. After addition of the carbon dioxide the pH of the resulting mixture was between 6.0 and 7.0.

The autoclave containing reactant liquid, catalyst, and carbon dioxide was then pressured with hydrogen and the hydrogenolysis reaction was carried out as in Example I. Analysis of the liquid products indicated that hydrogenolysis of the carboxy moiety of the feedstock was complete as in Example I.

Example III

A carboxylic acid feedstock identical with that described in Examples I and II is mixed with water and potassium carbonate to form a solution containing approximately 10.0 weight percent organic material, 70.0 weight percent water, 10.0 weight percent potassium bicarbonate, and 10.0 weight percent potassium carbonate. In this mixture the carboxylic acid content of the organic feedstock is, of course, present as the potassium salts.

Carbon dioxide is then bubbled through the solution prepared as just described in an amount at least sufficient to convert all the potassium carbonate present to potassium bicarbonate.

The neutralized solution is then placed in an autoclave with a hydrogenolysis catalyst as described in Examples I and II, along with carbon dioxide in an amount equal to at least one mole thereof per equivalent of potassium carboxylate contained in the feedstock solution. The autoclave is then pressured with hydrogen and the feedstock hydrogenolyzed as in Examples I and II.

After hydrogenolysis the atuoclave cooled to approximately 40°C, the hydrogen is released, and the liquid contents are drawn off into a separate vessel in which they reheated to approximately 100°C. Heating is continued until gas evolution from the liquid has ceased. The degassed liquid product is then cooled again to approximately 40°C. Two liquid phases are present, the upper phase consisting of hydroxymethyl-substituted derivatives of the carboxylic acids contained in the original hydrogenolysis feedstock while the lower phase comprises predominantly water containing dissolved potassium carbonate. The upper phase is drawn off for workup of the organic products as desired, while the lower phase is drawn off for reuse in neutralizing additional quantities of the carboxylic acid feedstock as previously described.

Of the carboxylic acid moiety contained in the crude feedstock prior to neutralization, approximately 95 percent is recovered in the form of the corresponding hydroxymethyl derivatives in the organic phase obtained after the degassing step just described. Any unconverted potassium carboxylate is recycled to the hydrogenolysis step with the aqueous layer obtained after the phase-separation step and is so ultimately recovered as the desired hydroxymethyl-substituted product.

The embodiment of the invention in which an exclusive property or privilege is claimed are defined as follows:

1. In a process for converting a feedstock comprising predominantly at least one member of the group consisting of carboxyalkanes, dicarboxyalkanes, hydroxycarboxyalkanes, and lactones of hydroxycarboxyalkanes having at least four carbon atoms in the molecule to a corresponding hydroxymethyl-substituted derivative by the hydrogenolysis of the carboxy moiety of said feedstock in the present of a rhenium black catalyst or a catalyst having a catalytically active metallic cobalt surface, the improvement which comprises:

preparing an alkali metal salt of said feedstock in aqueous solution;

buffering said solution of said salt to a pH between about 6.0 and about 7.0;

hydrogenolyzing said salt in said buffered solution in the presence of said catalyst at a temperature of 150°C to 300°C and at a pressure of about 5 to 500 atmospheres to form a liquid reaction product comprising said hydroxymethyl-substituted compound; and recovering said hydroxymethyl-substituted compound from said reaction product.

2. The process of claim 1 wherein the buffering system employed is an alkali metal bicarbonate system or an alkali metal acid phosphate system.

3. The process of claim 2 wherein the catalyst employed in said hydrogenolysis step comprises metallic cobalt.

4. The process of claim 3 wherein said salt solution is buffered with carbon dioxide and the bicarbonate of said alkali metal.

5. The process of claim 4 wherein said alkali metal is potassium.

* * * * *

PO-1050
(5/69)

UNITED STATES PATENT OFFICE
CERTIFICATE OF CORRECTION

Patent No. 3,855,319          Dated December 17, 1974

Inventor(s) Charles C. Hobbs, John A. Bedford

It is certified that error appears in the above-identified patent and that said Letters Patent are hereby corrected as shown below:

In column 1, line 30, for "diods" read -- diols --.

In column 1, line 33, for "simply" read -- simple --.

In column 1, line 59, for "process" read -- processes --.

In column 1, line 61, for "relation" read -- related --.

insert -- acid --.

In column 2, line 50, for "characteristics" read -- characteristic --.

In column 4, line 10, for "alkalai" read -- alkali --.

In column 6, line 43, at first occurrence of the word "carbonate" read --bicarbonate--.

In column 6, lines 55-56, delete "if vessel land is either discarded or,"

In column 8, line 5, for "weigth" read -- weight --.

In column 8, line 9, for "prevent" read -- preventing --.

In column 9, line 13, for "atuoclave" read -- autoclave is --.

Signed and sealed this 1st day of April 1975.

(SEAL)
Attest:

RUTH C. MASON
Attesting Officer

C. MARSHALL DANN
Commissioner of Patents
and Trademarks